United States Patent [19]
Bauer et al.

[11] Patent Number: 5,867,245
[45] Date of Patent: *Feb. 2, 1999

[54] DEVICE FOR SECURING DECORATIVE STRIPS TO SPECTACLE LENSES OR FRAMES

[76] Inventors: Swen Bauer, Schiregartenstrasse, D-63303 Dreicich; Michele Seminara, Trinkbrunnenstrasse 39, D-63322 Rodermark, both of Germany

[ * ] Notice: This patent issued on a continued prosecution application filed under 37 CFR 1.53(d), and is subject to the twenty year patent term provisions of 35 U.S.C. 154(a)(2).

[21] Appl. No.: 776,176
[22] PCT Filed: Jun. 27, 1995
[86] PCT No.: PCT/DE95/00824
  § 371 Date: Jan. 9, 1997
  § 102(e) Date: Jan. 9, 1997
[87] PCT Pub. No.: WO96/02864
  PCT Pub. Date: Feb. 1, 1996

[30] Foreign Application Priority Data

Jul. 16, 1994 [DE] Germany .......................... 44 25 183.1

[51] Int. Cl.[6] .............................. G02C 11/02; G02C 1/00
[52] U.S. Cl. .............................. 351/51; 351/149; 351/158
[58] Field of Search ................................ 351/51, 52, 103, 351/104, 105, 106, 109, 158, 140, 149

[56] References Cited

U.S. PATENT DOCUMENTS

| | | | |
|---|---|---|---|
| 2,384,867 | 9/1945 | Williams | 351/104 |
| 2,495,508 | 1/1950 | Cleaver | 351/52 |
| 2,868,074 | 1/1959 | De Angelis | 351/92 |
| 2,922,238 | 1/1960 | Neary | 351/52 |
| 4,313,652 | 2/1982 | Berman | 351/106 |
| 4,958,923 | 9/1990 | Rosenson | 351/52 |
| 4,981,350 | 1/1991 | Vitaloni | 351/52 |
| 5,499,063 | 3/1996 | Butler et al. | 351/41 |

FOREIGN PATENT DOCUMENTS

| | | |
|---|---|---|
| 954584 | 4/1964 | European Pat. Off. . |
| 0038093 | 3/1981 | European Pat. Off. . |
| 0599710 | 11/1993 | European Pat. Off. . |
| 1310129 | 11/1961 | France . |
| 7530026 | 1/1976 | Germany . |
| 7835794 | 5/1979 | Germany . |
| 3408782 | 8/1983 | Germany . |
| 8415521 | 7/1984 | Germany . |
| 9013476 | 7/1991 | Germany . |
| 4020789 | 7/1992 | Germany . |
| 9211754 | 12/1992 | Germany . |
| 9406505 | 7/1994 | Germany . |
| 2236196 | 9/1989 | United Kingdom . |

OTHER PUBLICATIONS

Document No. 3813 U/L Dated Feb. 9, 1968.
Document No. (28 846/Na–) Dated Jun. 13, 1997.

*Primary Examiner*—Huy Mai
*Attorney, Agent, or Firm*—Young & Basile, P.C.

[57] ABSTRACT

The invention relates to a device for securing decorative strips and spectacle lenses with one another or for fastening decorative strips on frames. The fastening herein occurs by means of a tongue and groove system. So that the decorative strips do not fall out of the groove or tongue, the groove or, respectively, the tongue is terminated by a lateral stop element. This stop element is connected for example by means of screw or snap connections with a spectacle frame.

17 Claims, 10 Drawing Sheets

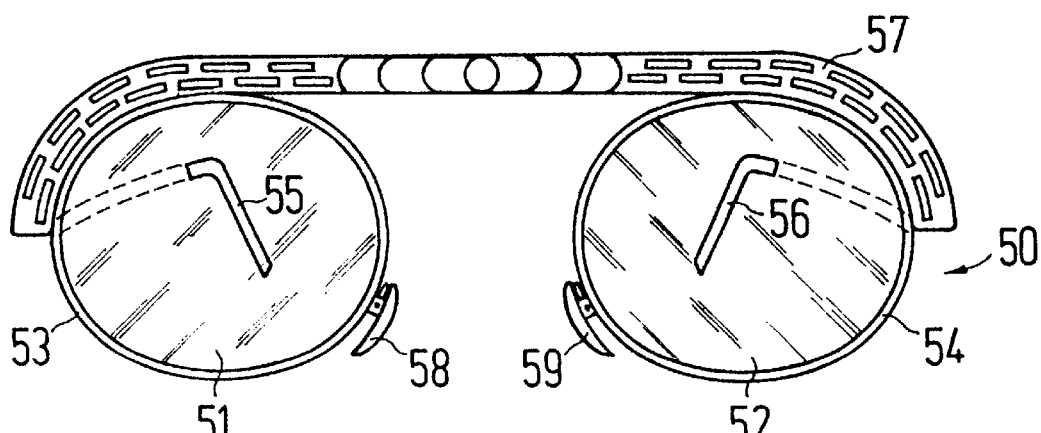
FIG.1
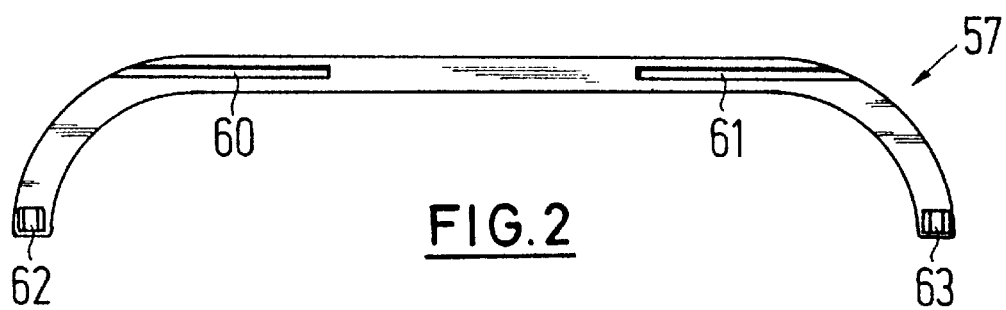
FIG.2
FIG.3
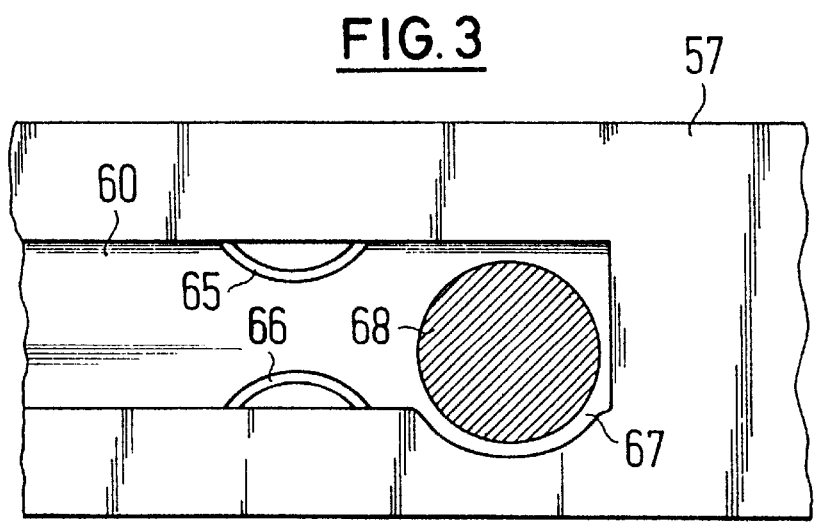
FIG.4
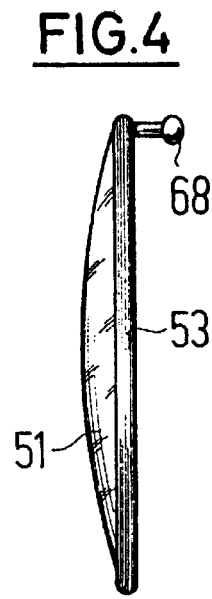

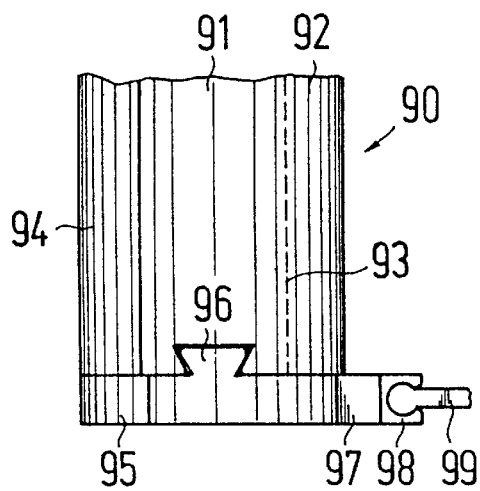
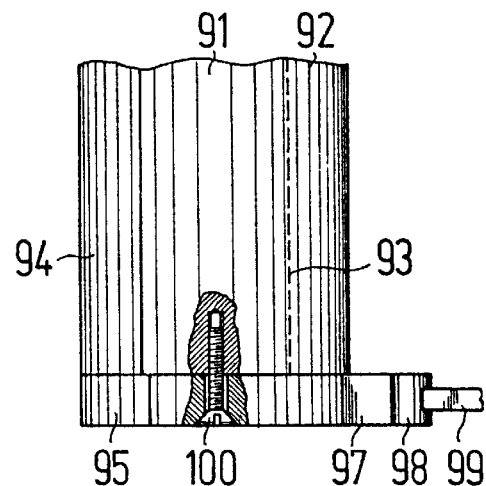
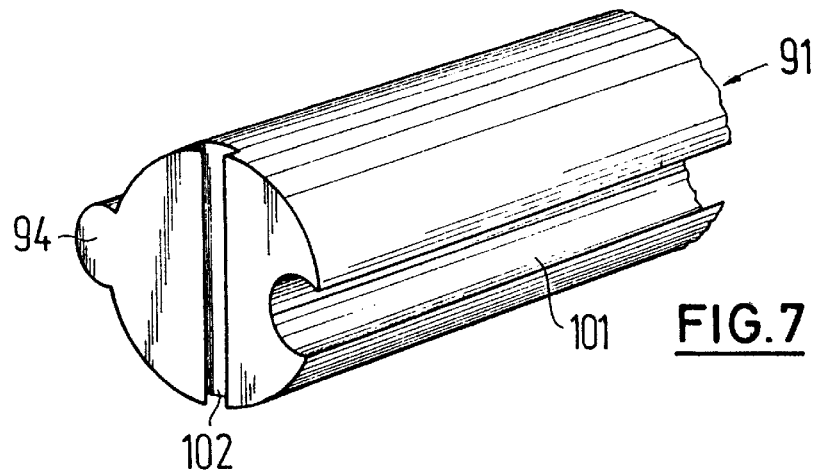
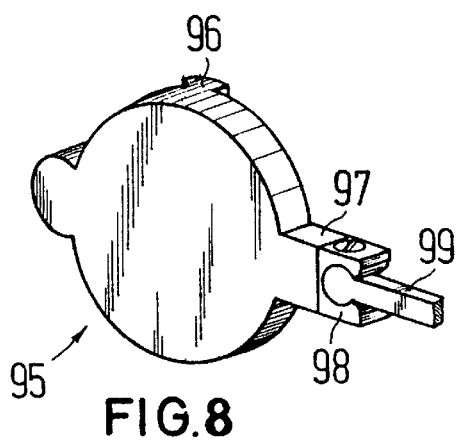
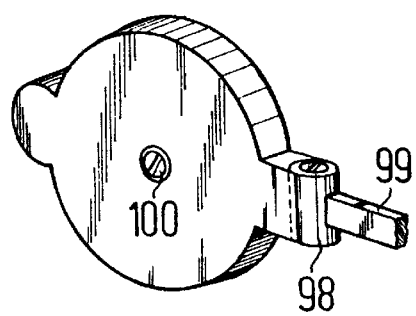

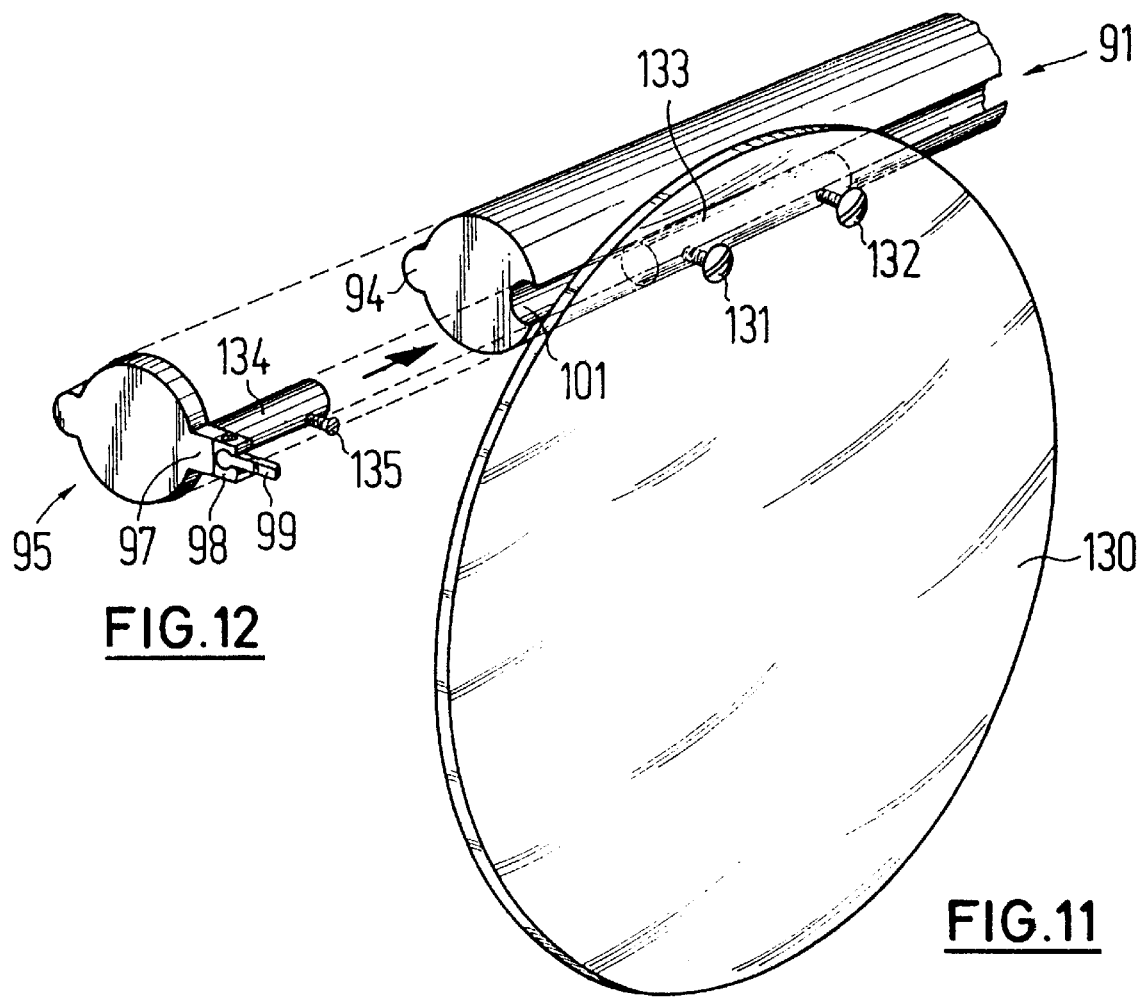
FIG.12
FIG.11
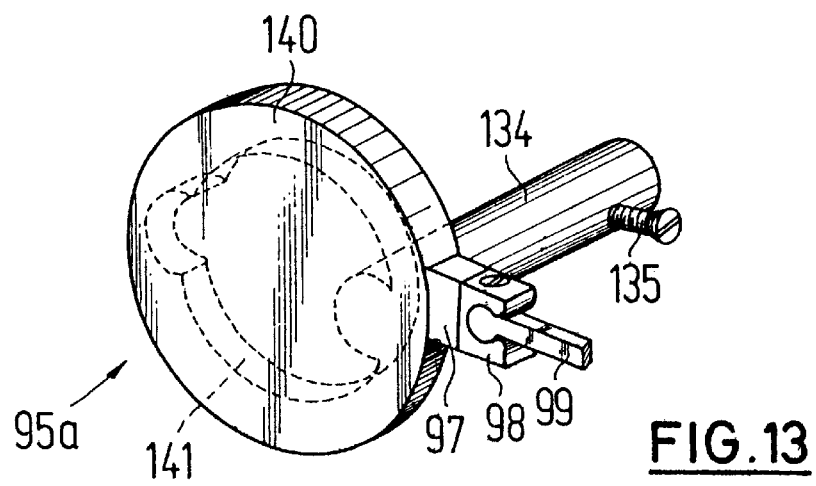
FIG.13

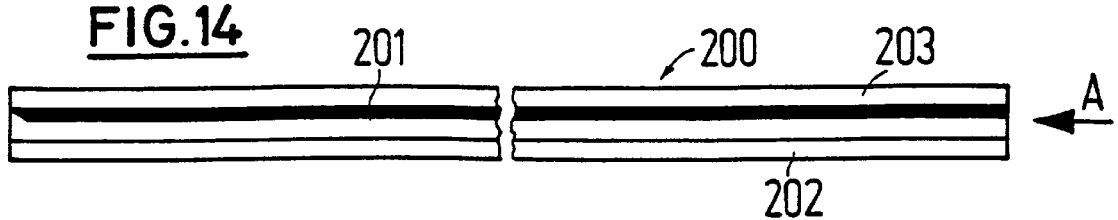
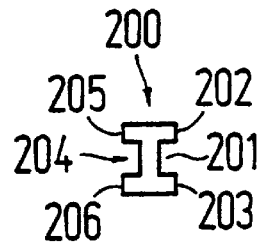
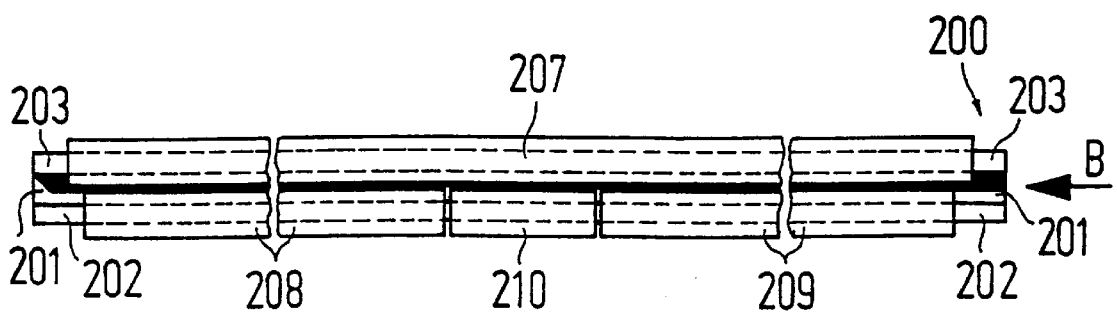
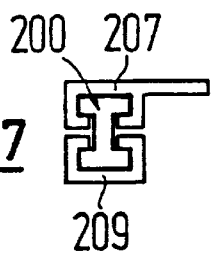
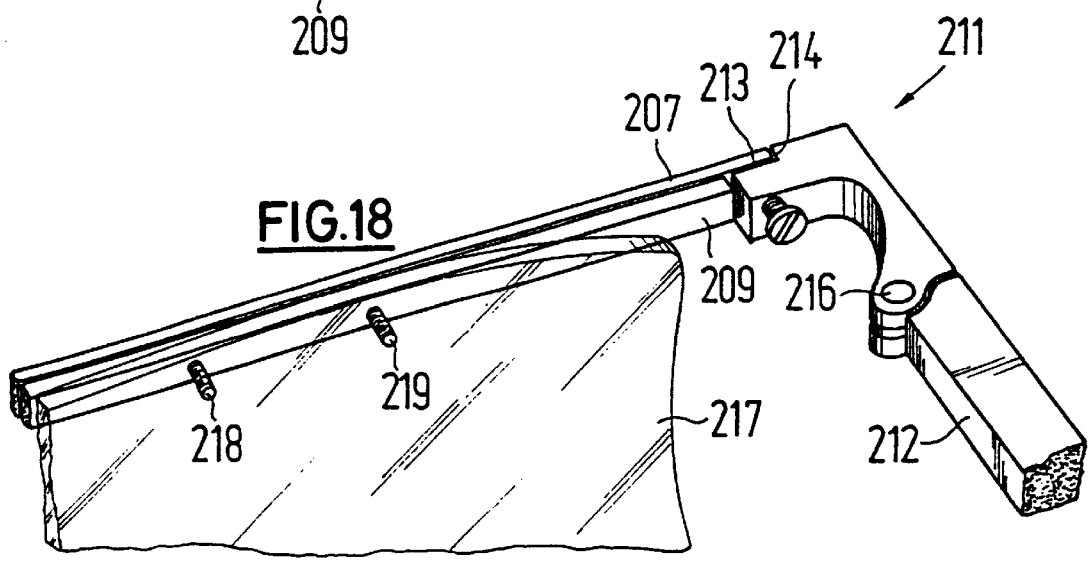

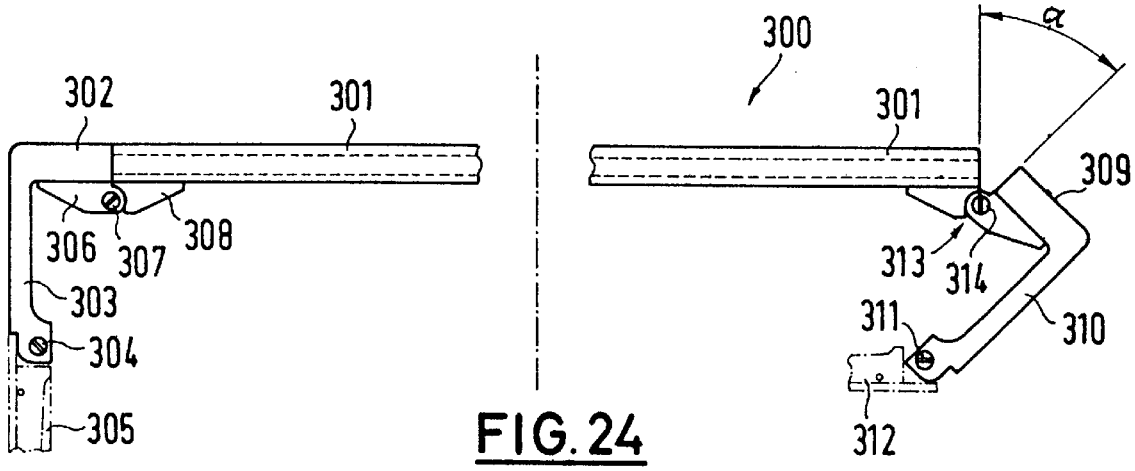
FIG. 24
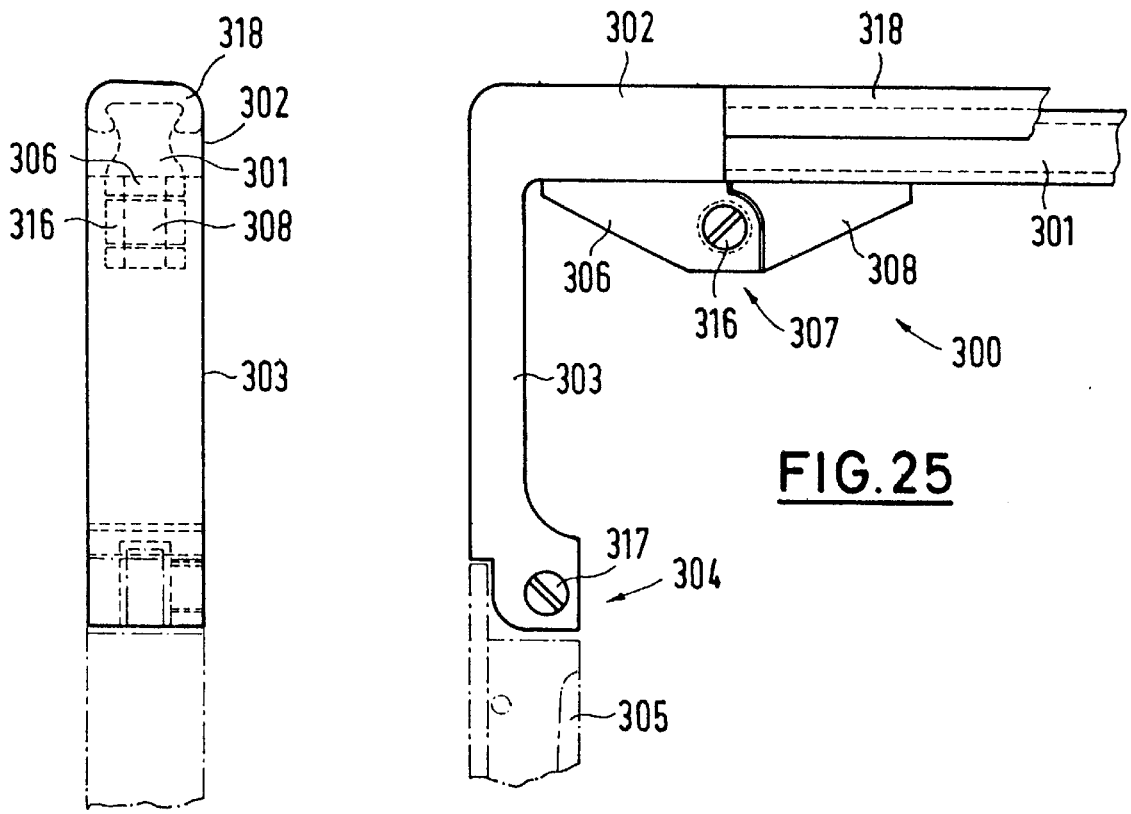
FIG. 25
FIG. 26

DEVICE FOR SECURING DECORATIVE STRIPS TO SPECTACLE LENSES OR FRAMES

BACKGROUND OF THE INVENTION

The invention relates to a spectacle frame.

Apart from their purely technical function to improve the vision of its wearer, spectacles have increasingly also assumed an aesthetic function so that for some time they are counted among the so-called fashion accessories.

Spectacle frames and high-quality optical lenses are relatively expensive, which prevents many spectacle wearers, for reasons of cost alone, from going with the fashion and acquiring new spectacles in short intervals.

The aim is therefore to develop spectacles so that they are variable with respect to their outer appearance.

Several spectacle frames are already known on which decorative strips and the like can be fastened which lend different appearances to the spectacles (Utility Patents DE GM 78 35 794, DE GM 75 30 026, DE GM 84 15 521, DE GM 90 13 476, DE GM 92 11 754, GB (Application, unexamined) 2 236 196, DE GM 19 86 222).

As a rule, the decorative strips are herein secured on the spectacle frames by being emplaced, clamped or stuck on but also by sliding them on with the aid of a tongue-and-groove (GB 954 584, FR 1 310 129).

In addition, a spectacle frame is known which comprises a temple piece which can be connected with a lens setting of spectacle frames wherein the connection is established via a pin and an associated groove (DE 34 08 782).

Furthermore the anchoring of decorative parts comprising metal on spectacles comprising synthetic material is known wherein these decorative parts are provided on the temple-piece joints and have on their back side guide elements in the form of a V, which engage the guidance recesses of synthetic spectacle frames (DE GM 19 85 756). But in this case an exchange of decorative strips is hardly possible since the V-form guidance elements engage fixedly the synthetic material of the spectacle frame.

Lastly, an adjustable spectacle is also known in which the temple pieces can be adapted to different head widths (DE PS 40 20 789). Herein the frame of the spectacle comprises a center part which is provided on both sides with slide rails. However, these spectacles are not suitable for applying decorative strips.

SUMMARY OF THE INVENTION

The invention addresses the problem of creating a spectacle frame according to a device for securing at least one of decorative strips to spectacle lenses and decorative strips to decorative frames, with which it is possible to vary the outer appearance of a spectacle frame by exchanging single elements and to connect these single elements securely with the spectacle frame.

This problem is solved through the characteristics of the present invention.

BRIEF DESCRIPTION OF THE DRAWINGS

Embodiment examples of the invention are depicted in the drawing and will be described in further detail in the following. In the drawing depict:

FIG. 1 a [pair of] spectacles with a decoration panel;

FIG. 2 a rear view of the decoration panel according to FIG. 1 which simultaneously serves as a holding strip;

FIG. 3 a securing device for a spectacle lens;

FIG. 4 a spectacle lens secured on a strip, seen from the side;

FIG. 5 a margin area of a holding strip for a decoration panel;

FIG. 6 a margin area of a further holding strip for a decoration panel;

FIG. 7 a perspective view of the margin area of the strip shown in FIG. 5;

FIG. 8 a first stop plate with spectacle hinge;

FIG. 9 a second stop plate with spectacle hinge,

FIG. 11 a modification of the strip according to FIG. 7 with inset spectacle lens;

FIG. 12 a closure for the strip according to FIG. 11;

FIG. 13 a further closure which can be slipped over a guide strip;

FIG. 14 a top view onto a guide rail for holding panels;

FIG. 15 the profile of the rail according to FIG. 14;

FIG. 16 a combination of guide rail and panels;

FIG. 17 the profile of the combination according to FIG. 16;

FIG. 18 a partial view of a [pair of] spectacles with mountable decorative panel and mountable spectacle lens;

FIG. 24 a joint configuration for releasing a decorative strip;

FIG. 25 at an enlarged scale the left side of the joint configuration depicted in FIG. 24;

FIG. 26 a side view of the arrangement depicted in FIG. 25;

DESCRIPTION OF THE PREFERRED EMBODIMENT

Figure 10:
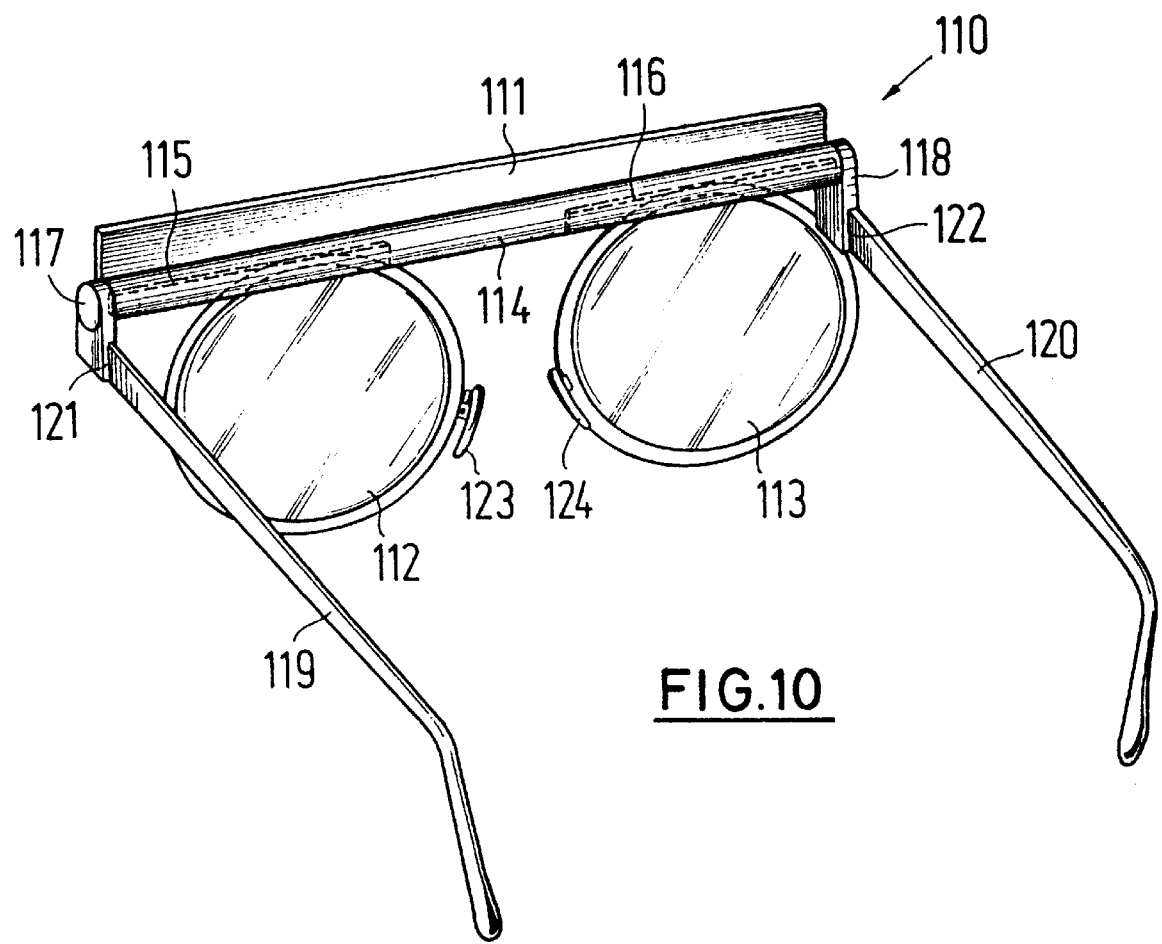
FIG. 10 a [pair of] spectacles whose lenses and whose frame are mounted on a retainer.

In FIG. 1 is depicted a [pair of] spectacles 50 comprising two spectacle lenses 51, 52, two settings 53, 54 for the spectacle lenses 51, 52, two temple pieces 55, 56, a decorative panel 57 and two nose stays 58, 59. The decoration panel 57 comprises semicircular and rectangular patterns which can be realized, for example, by mother-of-pearl flakes. The temple pieces 55, 56 are connected with the ends of the decoration panel 57 in such a way that they swivel. The spectacle lenses 51, 53 are slid into grooves of the decoration panel 57, which will be described in further detail in the following.

FIG. 2 shows the backside of the decoration panel 57. It can be seen that two grooves 60, 61 extending horizontally are provided into which can be introduced fastening nipples disposed in the upper region of the settings 53, 54 of the spectacle lenses 51, 52. 62, 63 denotes hinges with which the temple pieces 55, 56 are connected. The fact that the panel 57 is bent at its side downwardly at an angle allows fastening the temple pieces 55, 56 at the level of the ears.

In FIG. 3 is shown in detail how a spectacle lens is mounted in the decoration panel 57. For this purpose in a groove 60 two springs 65, 66 are disposed across which a nipple 68 disposed on a setting 53 of the spectacle lens is slid into a depression 67 of the groove 60.

FIG. 4 shows the nipple 68 again from the side and specifically in its connection with the setting 53. The decoration panel 57 provided with the temple pieces 55, 56 consequently makes it possible to exchange the spectacle lenses 51, 52. On the other hand, it is also possible to replace the decoration panel 57 while keeping the spectacle lenses.

The [pair of] spectacles shown in FIGS. 1 to 4, thus comprises a decorative strip 57, which comprises on its backside grooves 60, 61 in which the nipples 68 of the spectacle lenses engage as springs. A lateral stop element 65, 66, 67 is provided which prevents the "spring" 68 from falling out.

In FIG. 5 is shown the one end of a placement element 90 for the decorative strip of a [pair of] spectacles. This placement element 90 comprises an essentially cylindrical portion 91 into which a groove 92 having the cross section of a three-quarter circle is worked. The boundary of this three-quarter circle is marked with the dashed line 93. The groove 92 is in opposition with a projection 94 which in cross section also has the shape of a three-quarter circle. At the end of retainer 90 a cap 95 is provided which is inserted into a corresponding groove of retainer 90 with the aid of a dovetail projection 96. The cap 95 extends over the entire thickness of retainer 90 and, a portion 97 of it, even beyond. On this portion 97 a hinge 98 is flanged on which is connected with a temple piece 99.

FIG. 6 shows an alternative connection to the dovetail connection according to FIG. 5. Herein the cap 95 is connected by means of a screw 100 with the portion 91. The cap 95 serves in the cases of FIG. 5 and 6 as terminating element for a groove or a tongue into which a tongue or, respectively, a groove is inserted. Through this terminating element the groove or, respectively, tongue are prevented from falling out.

A perspective view of portion 91 without cap 95 is shown in FIG. 7. Herein the projection 94 with the cross section of a three-quarter circle as well as a groove 101 with the same cross-sectional shape are evident. A groove 102 with dovetail cross section is likewise evident. Projection or tongue 94 or the groove 101 are provided for holding decorative panels or spectacle lenses.

Cap 95 which is placed on the end of portion 91, is shown in FIG. 8. This cap 95 is essentially adapted to the cross-sectional form of portion 91. The same applies for the cap shown in FIG. 9 which corresponds to the cap with the screw fastening shown in FIG. 6. The projection of cap 95 corresponding to projection 94 must have a greater radius than the latter so that strips slid onto projection 94 cannot fall out.

Into groove 101 a nipple 68 (FIG. 4) of a spectacle lens or a setting of the spectacle lens can be inserted and brought into the desired position. In addition, a (not shown) decorative panel can be slid onto projection 94. So that the spectacle lens and the decorative panel cannot fall out again, the cap 95 is secured at the end of portion 91. The projection 97 serves therein for the purpose of allowing the inward folding of the temple piece 99 by 90 degrees.

FIG. 10 shows a further [pair of] spectacles 110 in which a decorative panel 111 as well as also spectacle lenses 112, 113 can be disposed on a retainer 114. This retainer 114 has therein a similar structure as the retainer 91 of FIG. 7. It comprises on its backside two guidance grooves 115, 116 for the spectacle lenses 112, 113 and on its front side a guidance, not evident in FIG. 10, for the decorative panel 111.

At the ends of retainer 114 are provided caps 117, 118 which are directed downwardly in order to allow temple pieces 119, 120 to be attached in a position which corresponds to the relative position of the ears with respect to the eyes. In the lower region of caps 117, 118 hinges 121, 122 are provided which make it possible to fold the temple pieces 119, 120 inwardly by 90 degrees. By 123, 124 are denoted elements which rest on the nostrils.

The caps 117, 118 prevents that the decorative strip 111 and/or the spectacle lenses 112, 113 fall out. It is understood that the grooves 115, 116 can have depressions or rasters which define a preferred position of the lenses 112, 113. The same applies for the projection, not shown in FIG. 10, for the guidance of the decorative strip 111.

The retainers or decorative strips can be implemented variously. It is for example possible to exchange grooves and projections or to implement the strips so as to be straight or curved. The decorative strip can comprise the most diverse materials and can be of all possible colors.

In FIG. 11 a variant of the strip according to FIG. 7 is shown in which a spectacle lens 130 is slid in and suspended. This spectacle lens is connected with screws 131, 132 or the like with a bolt 133, which can be inserted into the groove 101 and displaced horizontally. On the right side of this bolt 133 is disposed a (not shown) stop element in or behind groove 101. So that the spectacle lens 130 can be fixedly arrested, on the left side—as shown in FIG. 12—a bolt-form stop element 134 is provided which is connected with cap 95. In this embodiment example the cap 95 is connected with the end face of portion 91 without tongue and groove with the bolt 134 being slid into the groove 101 and arrested with a screw 135 at a suitable site.

In FIG. 13 a variant of cap 95 according to FIG. 12 is shown. This cap 95a comprises an opening 141 defined by a ring 140, which opening can be slid over the strip 91. This ensures a better adaptation of the bolt 134 of cap 95a to the bolt 133 in groove 101. While in the embodiment of FIG. 12 the cap 95 abuts the end of strip 91, and subsequently can no longer be displaced relative to it, displacing the ring 140 relative to strip 91 is possible. Displacement can take place until the end of bolt 134 abuts exactly the end of bolt 133.

So that the screw 135 (FIG. 12) does not need to be screwed on after the spectacle lens 130—as shown in FIG. 11—is fixedly mounted, the relative position between the bolt 133, 134 can be determined first and subsequently the spectacle lens can be secured with screws 131, 132. It is understood that the parts 97, 140, 134, 99, 135 etc. are each dimensioned so that no impacts with the spectacle lenses or other parts occur.

In FIG. 14 is depicted a top view onto a rail 200 which serves for holding spectacle lenses, nose pieces decorative strips and the like. This rail 200 comprises in its center a groove 201 disposed between two raised edge portions 202, 203.

A profile view in the direction of arrow A of the same rail 200 is depicted in FIG. 15. It is evident that the rail 200 also comprises on its backside a groove 204 which is also disposed between two edge portions 205, 206. For the realization of the invention one of the two grooves 201, 204 is sufficient; however in some cases it is better to have two grooves 201, 204 in order to attach additional devices.

In FIG. 16 the rail 200 with slid-on panels 207 to 210 is shown. The panel 207 is herein the decorative strip proper while panels 208 and 209 serve for bearing spectacle lenses. The small central panel 210 is provided for supporting a nose piece. The decorative panel 207 is somewhat larger than the sum of panels 208, 209, 210.

A profile view of the device according to FIG. 16 is shown in FIG. 17. The two panels 207 and 209 extend herein over the edge portions of rail 200 and engage the grooves so that they can be displaced parallel to rail 200.

In FIG. 18 rail 200 with the panels 207 and 209 slid on is again depicted in perspective view. A corner piece 211 is shown, which is connected to the rail 200 as well as also to a spectacle side piece 212. Into this corner piece 211 one end of rail 200 is inserted. The outer contours of the corner piece 211 are adapted to the panels 207, 209, which are of different lengths. Its inner contours, in contrast, are adapted to the outer contours of the rail 200 so that an L-form recess with shanks 213, 214 results. By means of a screw 215 a connection between the corner piece 211 and the rail 200 can be established. If the screw 215 is tightened, it sets slightly into the side part 202 of rail 200. The corner piece 211 has at its other end a pivot bearing 216 for the temple piece 212.

A spectacle lens 217 is connected with screws 218, 219 to the panel 209.

In FIG. 18 is clearly evident that not only a decorative panel 207 can be subsequently provided but also that the spectacle lenses 217 and the panel 209 are exchangeable.

FIG. 19 shows once again a left corner piece 223 in top view, in which some details are shown more clearly than in FIG. 18. With an externally corrugated screw head 225 the screw 227 is herein screwed onto the rail 200. 226 denotes a hinge which in terms of function corresponds to the hinge 216 according to FIG. 26.

Figure 20:
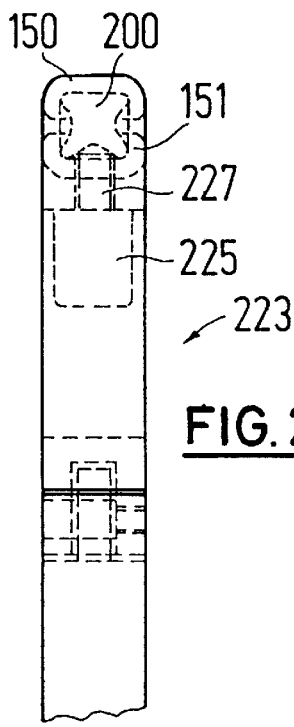
FIG. 20 a corner piece rotated by 90 degrees relative to FIG. 19.
Figure 19:
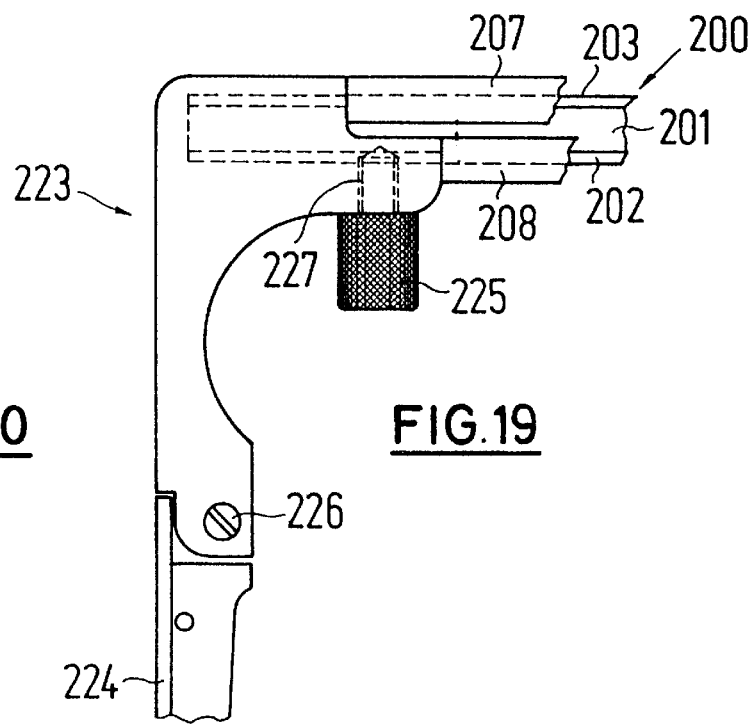
FIG. 19 a corner piece for connecting temple pieces and spectacle lenses.

FIG. 20 shows the corner piece 223 of FIG. 19 in a view rotated by 90 degrees. It shows that the corner piece 223 is provided on the inside with guides 150, 151 which guide the rail.

Figure 21:
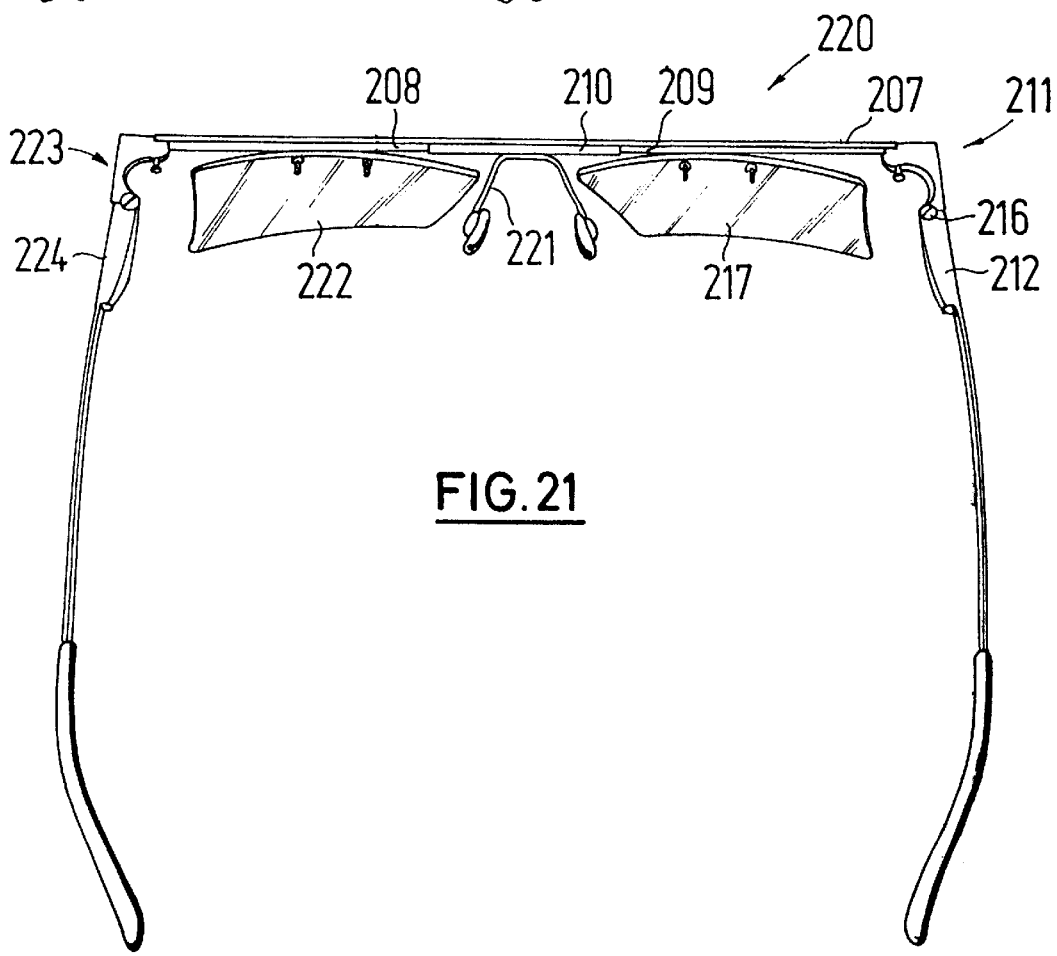
FIG. 21 a total view of a [pair of] spectacles which comprises the elements according to the invention.

FIG. 21 represents a total view of a [pair of] spectacles 220 which comprises the previously described parts. A nose part 221 is depicted which is disposed on the central panel 210.

Figure 22:
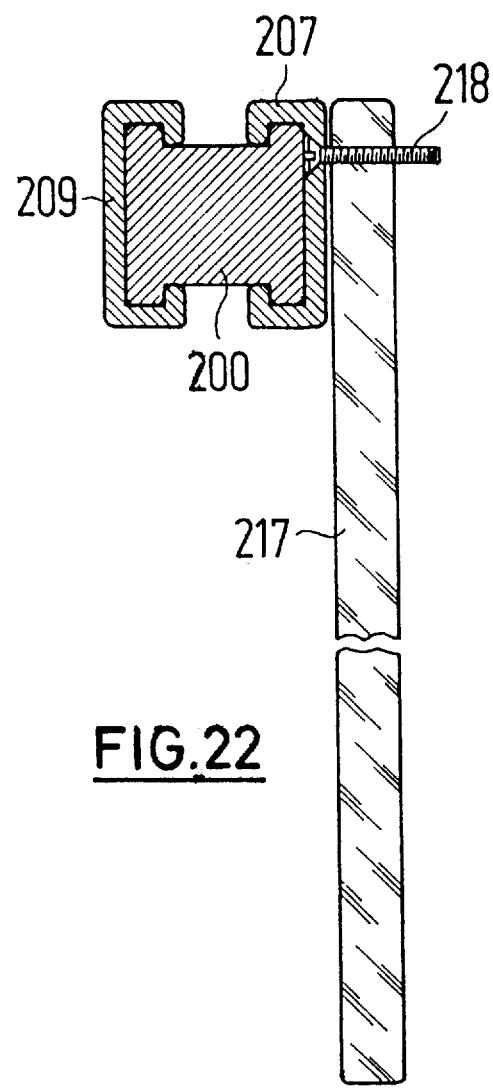
FIG. 22 a detail of a possible securement of a spectacle lens to a panel.

FIG. 22 shows in detail the way in which a spectacle lens 217 can be connected to a panel 207. The double T-rail 200 with the slid-on panels 207, 209 are herein evident. Before panel 207 is slid onto the rail 200, the spectacle lens 217 is connected to the panel by means of a screw 218. The panel 209 serves herein for example as decorative panel.

Figure 23:
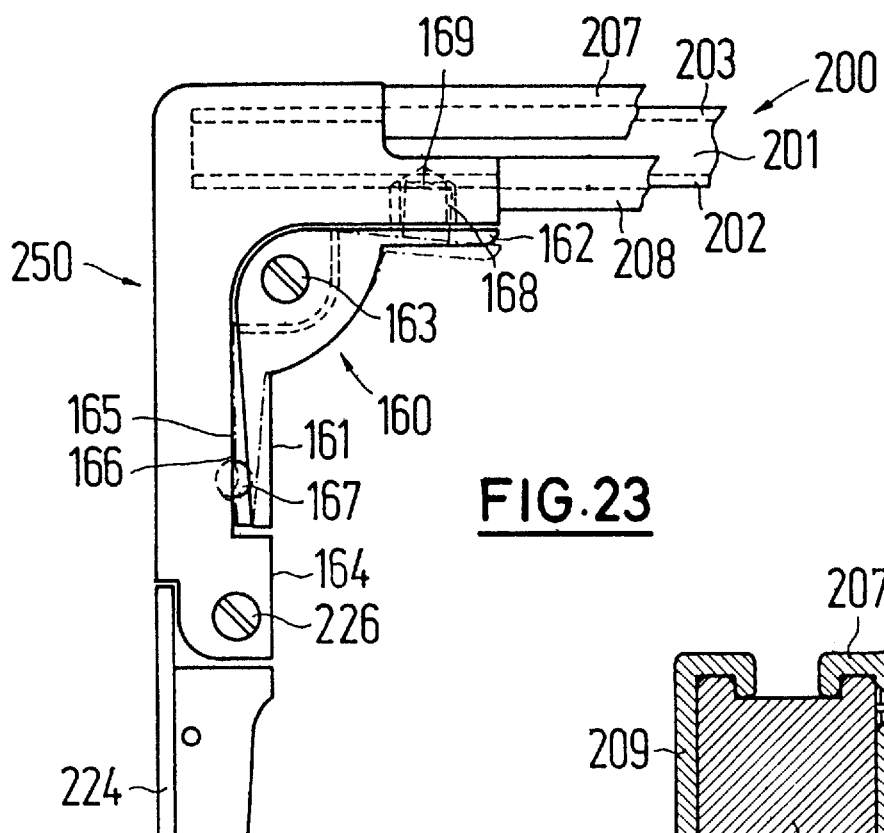
FIG. 23 a corner piece which can be mounted without screws.

FIG. 23 shows a decorative corner support 250 which can be used as an alternative to corner piece 223 of FIG. 19.

Those parts which correspond to parts of the device according to FIG. 19 are provided with the same reference numbers.

In contrast to the device of FIG. 19, the device according to FIG. 23 comprises no screw connections but rather a snap or clamp connection. For this purpose a rocker 160 is provided comprising two shanks 161, 162 which are disposed pivotably about a pivot bearing 163. On the inside 164 of the corner piece 250 is disposed a recess 165 in which rests a silicon ball 167 in a depression 166. The silicon ball 167 acts as a compression spring. If the rail 200 is to be removed from the corner piece 250, pressure is exerted on the shank 161 and thus against the silicon ball 167. The rocker 160 assumes hereby a position indicated by dashed lines. Due to this rocking motion, a pin 168 disposed on shank 162 is moved with its tip out of a cavity 169 located in rail 200.

In FIG. 24 a device 300 for arresting decorative strips and the like is shown, which differs from that in FIG. 22. The rail 301, onto which the panels can be slid, abuts herein a shank 302 which changes over into a shank extending at right angles hereto. Adjoining this last mentioned shank 303 is a joint 304 with which a temple piece 305 is connected.

It is essential that the shank 302 is provided with a flange 306 which engages via an arrestable joint 307 a flange 308 which is connected with rail 301. On the right side the shanks 309, 310 are folded over. The joint 313 corresponding to joint 307 can be arrested by means of a screw 314. The shank 309 can be swivelled relative to rail 301 by an angle a which extends to at least 90 degrees. It is then possible to slide a panel onto rail 301 from the side. Once the panel is slid on, the shanks 309, 310 are swivelled back again by 90 degrees so that the panel can no longer fall out. For securement the screw 314 is subsequently fixedly tightened.

In FIG. 25 the left side of the device shown in FIG. 24 is depicted again in an enlarged scale. Herein the locking screws 316, 317 as well as rail 301 with a panel 318 are depicted.

FIG. 26 shows the device 300 in a view rotated by 90 degrees. The slid-on panel 318 as well as rail 301 are shown. The flange 306 comprises two webs which receive the sole center web of flange 308. If screw 316 is tightened, the two outer webs of flange 306 press on the center web of flange 308 so that both flanges 306, 308 can no longer be rotated relative to each other.

Figure 27:
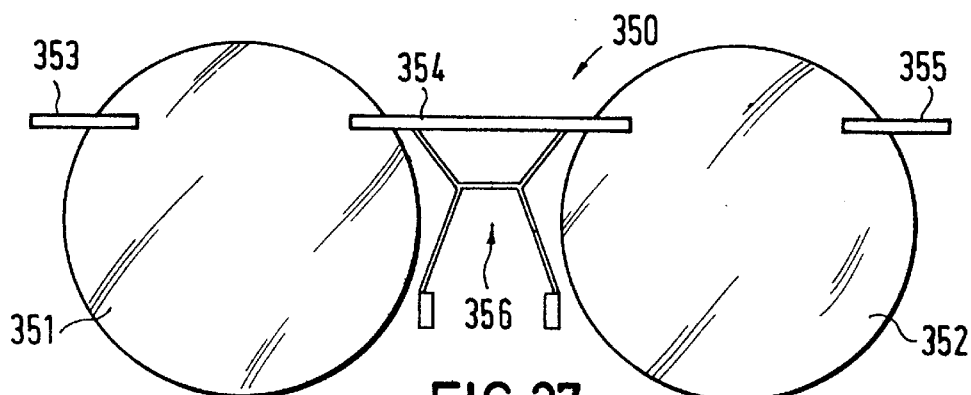
FIG. 27 front view of a spectacle frame with spectacle lenses.

In FIG. 27 a spectacle frame 350 with two spectacle lenses 351, 352 is shown which comprises partial rails 353, 354, 355 onto which panels or the like can be slid. On the central rail 354 is fastened a nose rest 356.

Figure 28:
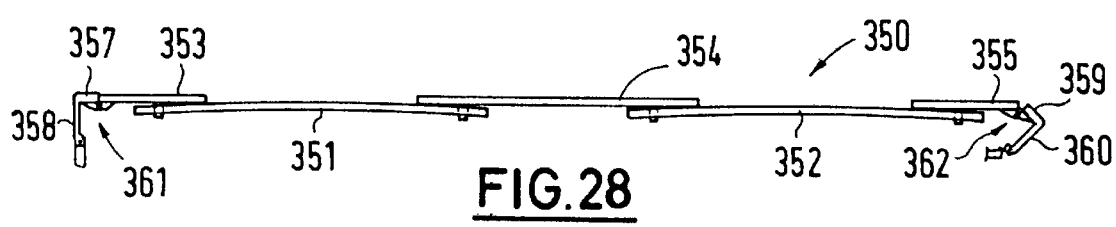
FIG. 28 top view onto the spectacle frame of FIG. 27.

FIG. 28 depicts the spectacle frame 350 with spectacle lenses 351, 352 again in top view. In addition, the lateral shanks 357, 358 or respectively 359, 360 are shown which can be swivelled relative to the partial rails 353, 355, and specifically about the joints 361, 362.

Figure 29A:
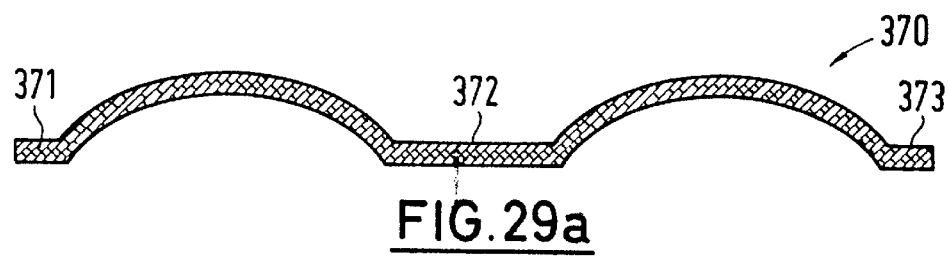
FIG. 29a a first panel for the spectacle frame according to FIGS. 27, 28.
Figure 29B:
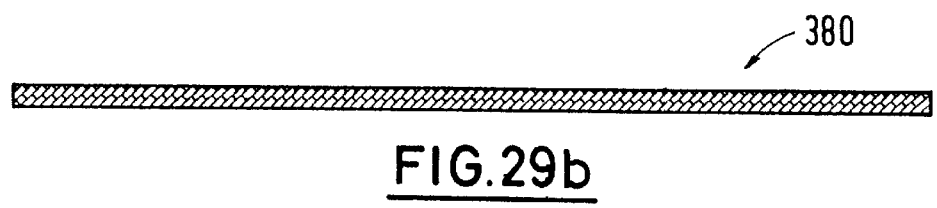
FIG. 29b a second panel for the spectacle frame according to FIGS. 27, 28.
Figure 29C:
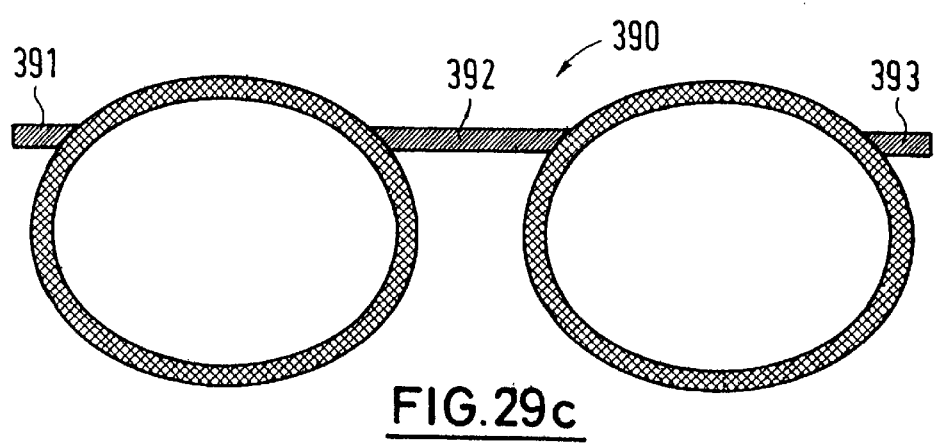
FIG. 29c a third panel for the spectacle frame according to FIGS. 27, 28.

Panels which can be slid onto the partial rails 353, 354, 355 are shown in FIGS. 29a to 29c. Panel 370 comprises, for example, three partial pieces 371, 372, 373 which can be assigned to the partial rails 353, 354, 355. Consequently these partial pieces 371, 372, 373 can be slid laterally onto the partial rails 353, 354, 355. The corresponding tongues and grooves are omitted in FIGS. 27 and 29a for the sake of greater clarity.

Although the spectacle frame 350 comprises three partial rails 353, 354, 355 a unitary panel 380, such as is shown in FIG. 29b, can be slid onto these partial rails.

But it is also possible to slide a panel 390, such as is shown in FIG. 29c, with its partial pieces 391, 392, 393 onto the spectacle frame 350.

Figures 30, 31:
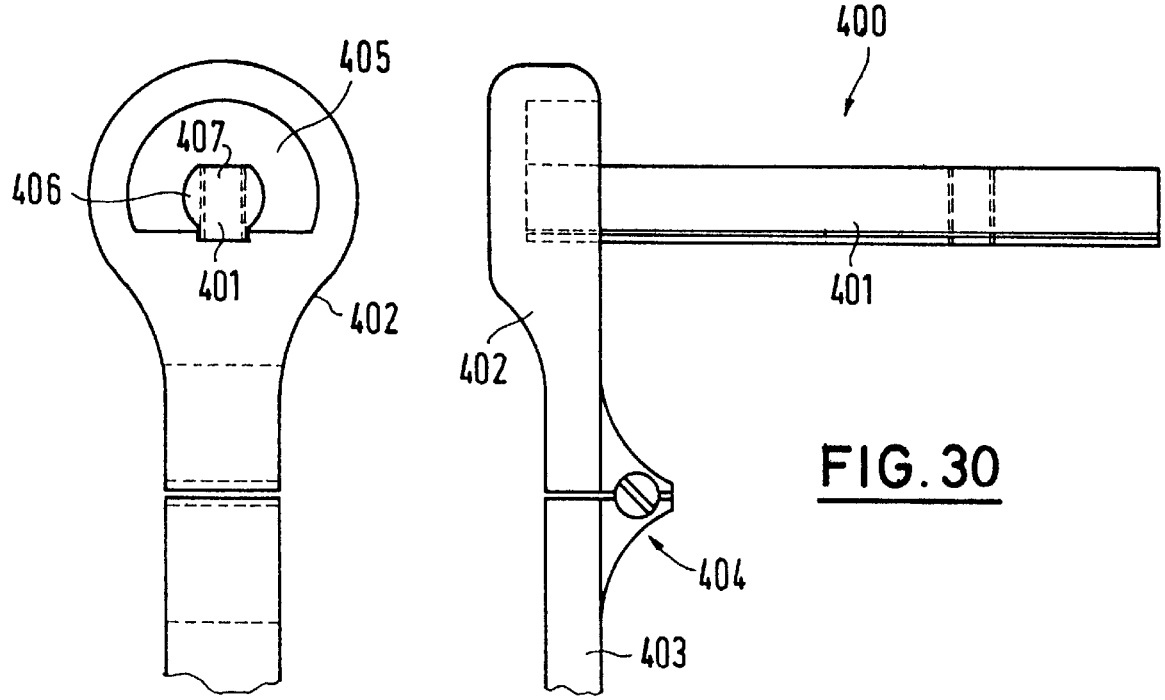
FIG. 30 a second variant for a joint configuration.
FIG. 31 a side view of the joint configuration of FIG. 30.

In FIG. 30 a further variant of a device 400 is shown with which it is possible to prevent decorative panels and the like from becoming detached from a spectacle frame. It can be seen here that a specially implemented rail 401 is supported in a specially implemented shank 402. This shank 402 can be swivelled about a temple piece 403 via a joint 404.

In FIG. 31 the device of FIG. 30 is shown in a view rotated by 90 degrees. It can be seen that shank 402 comprises a recess 405 in the form of a three-quarter cylinder wherein in the center 406 a further recess is provided into which the rail 401 can be inserted. By means of a pin 407 this rail 401 can be arrested in recess 406.

We claim:

1. A device for securing a decorative strip to at least one of a spectacle lens and a spectacle frame, comprising:
   a projection on one of the spectacle lens and the frame;
   a channel located in the other one of the frame and the decorative strip for receiving the projection on the one of the spectacle lens and the frame; and
   a lateral stop element,
   wherein the channel and the projection each has an end, and at least one end is terminated by the lateral stop element, wherein the lateral stop element is selectably connectable to the spectacle frame by means of one of a screw and snap connections.

2. A device, for securing a decorative strip to at least one of a spectacle lens and a spectacle frame, comprising:
   a projection on one of the spectacle lens and the frame;
   a channel located in the other one of the frame and the decorative strip for receiving the projection on the one of the spectacle lens and the frame;
   a lateral stop element; and
   a temple piece connected to the lateral stop element, wherein the channel and the projection each has an end, and at least one end is terminated by the lateral stop element.

3. The device as stated in claim 2, wherein the temple piece can be swivelled relative to the spectacle lens.

4. The device as stated in claim 2, wherein the lateral stop element is provided with a hinge for connecting to the temple piece.

5. A device for securing a decorative strip to at least one of a spectacle lens and a spectacle frame, comprising:
   a projection on one of the spectacle lens and the frame;
   a channel located in the other one of the frame and the decorative strip for receiving the projection on the one of the spectacle lens and the frame; and
   a lateral stop element,
   wherein the channel and the projection each has an end, and at least one end is terminated by the lateral stop element, wherein the stop element includes a disk having an inside portion and a bolt extending perpendicularly on the inside portion of the disk, said bolt engageable in the channel wherein the spectacle lens is connected to the spectacle frame with another bolt engageable in the same channel.

6. The device of claim 5 further comprising a second bolt slidable receivable in the same channel wherein said spectacle lens is securable to said second bolt with screws.

7. A spectacle mounting device comprising:
   a spectacle frame;
   at least one spectacle lens;
   a projection secured on the spectacle lens and a channel located in the spectacle frame for slidably receiving the projection; and
   a lateral stop element, wherein the channel is terminated at an end, and the lateral stop element is positioned at the end of the channel, wherein the spectacle frame has a double T-support configuration and the projection has a U-rail configuration, wherein a first projection is slidably received on one T-support of the spectacle frame and a second projection is slidably received on the other T-support of the spectacle frame.

8. The device as stated in claim 7 wherein at least one U-rail is arrested by means of a screw having a tip engageable to the double T-support.

9. The device as stated in claim 7, wherein the stop element has a step-form configuration having an upper step serving as a stop element for the decorative strip and the lower step serving as a stop element for a support and wherein the lower step is connected by means of a screw to the double T-support.

10. The device as stated in claim 7, wherein the stop element is releasibly connected by means of a rocker with the double T-support.

11. The device as stated in claim 10, wherein the stop element has two shanks and the rocker is pivotable about a point disposed in a transition zone located between the two shanks of the stop element.

12. The device as stated in claim 10, wherein the rocker has at least one arm and the one arm of the rocker can be pressed against a spring disposed between said rocker and said stop element.

13. A spectacle mounting device comprising:
   a spectacle frame;
   at least one spectacle lens;
   a projection secured on the spectacle lens and a channel located in the spectacle frame for slidably receiving the projection; and
   a lateral stop element, wherein the channel is terminated at an end, and the lateral stop element is positioned at the end of the channel, wherein the lateral stop element defines a swivelable temple piece comprising two integral shanks extending perpendicularly to each other.

14. The device as stated in claim 13, wherein the temple piece comprises a first lap-joint connected to the spectacle frame and clampably connected with a second lap-joint, said second lap-joint secured to one of the shanks of the temple piece.

15. The device of claim 14 wherein the second lap-joint is pivotable about a joint connecting the first and second lap-joints.

16. A spectacle mounting device comprising:
   a spectacle frame defining a rail;
   at least one spectacle lens;
   a projection secured on the spectacle lens and a channel located in the spectacle frame for slidably receiving the projection; and
   a lateral stop element, wherein the channel is terminated at an end, and the lateral stop element is positioned at the end of the channel, wherein the lateral stop element defines a shank and the shank has a first recess in the form of a three-quarter cylinder having a center therein, said center having another recess for receiving the rail.

17. A device for securing a decorative strip to a spectacle frame comprising:
   a projection on one of the frame and decorative strip;
   a channel located in the other one of the decorative strip and frame for receiving the projection, wherein the channel and the projection each has an end; and
   a lateral stop element terminating at the ends of said channel and said projection, wherein the lateral stop element is a swivelable piece comprising two shanks extending substantially perpendicularly to each other.

* * * * *